United States Patent
Palmon et al.

(10) Patent No.: US 7,493,301 B2
(45) Date of Patent: *Feb. 17, 2009

(54) CREATING AND SHARING COLLECTIONS OF LINKS FOR CONDUCTING A SEARCH DIRECTED BY A HIERARCHY-FREE SET OF TOPICS, AND A USER INTERFACE THEREFOR

(75) Inventors: Eran Palmon, Palo Alto, CA (US); Frank Smadja, Haifa (IL); Ofer Ben-Shachar, Palo Alto, CA (US)

(73) Assignee: Suggestica, Inc.

( * ) Notice: Subject to any disclaimer, the term of this patent is extended or adjusted under 35 U.S.C. 154(b) by 600 days.

This patent is subject to a terminal disclaimer.

(21) Appl. No.: 11/222,663

(22) Filed: Sep. 9, 2005

(65) Prior Publication Data
US 2006/0069674 A1    Mar. 30, 2006

Related U.S. Application Data

(60) Provisional application No. 60/621,290, filed on Oct. 22, 2004, provisional application No. 60/609,215, filed on Sep. 10, 2004.

(51) Int. Cl.
*G06F 7/00* (2006.01)
(52) U.S. Cl. ............................................. 707/1; 707/10
(58) Field of Classification Search ................ 707/1–10, 707/102
See application file for complete search history.

(56) References Cited

U.S. PATENT DOCUMENTS

| 5,924,090 A | 7/1999 | Krellenstein | 707/5 |
| 5,932,807 A | 8/1999 | Mallart | 73/641 |
| 6,064,971 A | 5/2000 | Hartnett | 705/7 |

(Continued)

OTHER PUBLICATIONS

K. Bharat and M. R. Henzinger. "Improved Algorithms for Topic Distillation in a Hyperlinked Environment." Proceedings of SIGIR-98, 21st ACM International Conference on Research and Development in Information Retrieval, Melbourne, Australia, pp. 104-111, 1998.

(Continued)

*Primary Examiner*—Wilson Lee
(74) *Attorney, Agent, or Firm*—Tucker Ellis & West LLP (57) ABSTRACT

A method and a carrier medium carrying computer code to execute a method. The method includes defining a set of topics for attachment to one or more information items by at least one user (a registered searcher), the defining the topics including accepting from at least one user at least one topic, and adding the topic to the plurality of topics. The topics do not necessarily have a hierarchical structure. Each topic is for attachment to one or more information item. The attached topics are for searching by a particular searcher for information item(s) according to search request information, including at least one topic of the set of topics, the searching including identifying at least one information item that has attachment to the topic(s) of the search request information. The method further includes defining a collection of attachments that can be viewed and searched by a corresponding group of at least one user, the corresponding group defined for the collection. Each attachment in the collection being between a topic and one or more information items.

2 Claims, 5 Drawing Sheets

U.S. PATENT DOCUMENTS

| | | | |
|---|---|---|---|
| 6,421,675 | B1 | 7/2002 | Ryan et al. ............... 707/100 |
| 6,513,036 | B2 | 1/2003 | Fruensgaard et al. ........... 707/4 |
| 2002/0040363 | A1 | 4/2002 | Wolfman et al. ............... 707/5 |
| 2002/0091835 | A1 | 7/2002 | Lentini et al. ............... 709/227 |
| 2002/0112028 | A1 | 8/2002 | Colwill, Jr. ................. 709/218 |
| 2002/0120619 | A1 | 8/2002 | Marso et al. ................... 707/3 |
| 2003/0014399 | A1 | 1/2003 | Hansen et al. .................. 707/3 |
| 2003/0055831 | A1 | 3/2003 | Ryan et al. .................. 707/100 |
| 2003/0055983 | A1* | 3/2003 | Callegari ..................... 709/227 |
| 2003/0088554 | A1 | 5/2003 | Ryan et al. ..................... 707/3 |
| 2004/0205065 | A1 | 10/2004 | Petras et al. .................. 707/5 |
| 2005/0055306 | A1 | 3/2005 | Miller et al. .................. 705/37 |
| 2005/0071328 | A1 | 3/2005 | Lawrence ....................... 707/3 |
| 2005/0086248 | A1* | 4/2005 | Atchison ..................... 707/102 |

OTHER PUBLICATIONS

B. D. Davison, A. Gerasoulis, K. Kleisouris, Y. Lu, H. Seo, W. Wang and B. Wu. "DiscoWeb: Applying Link Analysis to Web Search." Proceedings of the Eighth International World Wide Web Conference, Toronto, Canada, p. 148, 1999.

Osmar R. Zaïane. "From Resource Discovery to Knowledge Discovery on the Internet." Technical report CMPT1998-13, Computing Science Department, Simon Fraser University, Canada, 1998. Available online at: citeseer.ist.psu.edu/117999.html.

S. Brin and L. Page. "The Anatomy of a Large-Scale Hypertextual Web Search Engine." WWW7 / Computer Networks and ISDN Systems, vol. 30, No. 1-7, pp. 107-117, 1998. Also available online at: http://www-db.stanford.edu/~backrub/google.html, and www-db.stanford.edu/pub/papers/google.pdf.

"History of Search Engines and Directories-Search Engine History." Downloaded Dec. 7, 2005. SEO Consultants Directory, Orange, CA. Available online at: http://www.seoconsultants.com/search-engines/history/.

Chris Sherman. "Yahoo Launches My Web Personal Search." Published online by SearchEngineWatch.com on Apr. 27, 2005. Downloaded Aug. 11, 2005. Available online at http://searchenginewatch.com/.

"Northern Light Enterprise Search Engine Overview White Paper." Dated Jun. 15, 2004, by Northern Light Group LLC, Cambridge, MA, and also available online at: www.northernlight.com.

"Learning Search: Advanced search service for websites everywhere." Downloaded Aug. 20, 2004. SLI Systems, Cupertino, CA. Available online at: http://www.sli-systems.com/learning_search.shtml.

"Related Search: Automatically generated search suggestions for search engines." Downloaded Aug. 20, 2004. SLI Systems, Cupertino, CA. Available online at: http://www.sli-systems.com/related_search.php.

Chris Sherman. "Yahoo Introduces Personal Search." Published online by SearchEngineWatch.com on Oct. 5, 2004. Downloaded Aug. 11, 2005. Available online at: http://searchenginewatch.com/.

* cited by examiner

CREATING AND SHARING COLLECTIONS OF LINKS FOR CONDUCTING A SEARCH DIRECTED BY A HIERARCHY-FREE SET OF TOPICS, AND A USER INTERFACE THEREFOR

RELATED PATENT APPLICATIONS

The present invention claims priority of U.S. Provisional Patent Application Ser. No. 60/621,290 to inventors Palmon, et al., filed Oct. 22, 2004, and titled: CREATING AND SHARING COLLECTIONS OF LINKS FOR CONDUCTING A SEARCH DIRECTED BY A HIERARCHY-FREE SET OF TOPICS, AND A USER INTERFACE THEREFOR. Such U.S. Provisional Patent Application Ser. No. 60/609,215 is incorporated herein by reference in its entirety.

The present invention also claims priority of U.S. Provisional Patent Application Ser. No. 60/609,215 to inventors Palmon, et al., filed Sep. 10, 2004, and titled USER CREATING AND RATING OF ATTACHMENTS FOR CONDUCTING A SEARCH DIRECTED BY A HIERARCHY-FREE SET OF TOPICS, AND A USER INTERFACE THEREOF. Such U.S. Provisional Patent Application Ser. No. 60/609,215 is incorporated herein by reference in its entirety, and is referred to herein as the Parent Application. The Parent Application is included herein as an Appendix.

BACKGROUND

The present invention is related to searching for information, for example, searching for information on the Internet. In particular, the present invention is related to searching for information guided by a set of topics such as keywords, wherein the set of topics is not necessarily hierarchical, and wherein during any particular search, any search hierarchy of topics is created on the fly.

OVERVIEW OF THE SYSTEM DESCRIBED IN THE PARENT APPLICATION

The Parent Application describes a system for a user to create and rate attachments for conducting a search. The search is directed by a hierarchy-free set of topics. The Parent Application also describes a user application thereof. An implementation of a system incorporating the aspects described in the Parent Application is called "Topixa" herein. By "Improved Topixa" is meant a Topixa system incorporating one or more aspects of the present invention.

One aspect of the Topixa system described in the Parent Application is the providing of a set of topics useful for guiding a search, each topic having attachments to one or more items of information, e.g., Web pages that are appropriate for the topic. The set of topics is not necessarily hierarchically arranged. Rather, for a particular search starting with an initial topic or a search phrase, a hierarchy of topics for the particular search is determined on the fly. Each step of the hierarchical search includes selecting a topic or providing a search phrase, and results in a set of suggested topics for furthering the search. At any stage, results for the search so far, e.g., URLs of the information items, are also provided. The set of suggested topics is generated by an analysis of the attachments of the search results under the initial search or the search topic. One aspect of the invention is that the suggested topics include one or more refinement topics determined from the plurality of topics according to a refinement topic criterion.

Thus, a search may be hierarchical in that the search may traverse a set of topics by the searcher selecting one topic, then next time a page is requested, another topic, and so forth. For example by selecting a search topic A, the searcher will be shown a set of results under, i.e., attached to topic A. By now selecting a second topic, say topic B, the searcher will see results that are attached to topic B from within the previously shown results, thus also attached to topic A. Thus, a hierarchy of topics is generated on the fly for the searcher. By a "search topic path" is meant the set of topics selected during a particular search by a particular searcher. The last topic in a search topic path is the most recently selected topic in such a traversal. In one embodiment, the order of the search topic path is not important, in that any URL in a search topic path has an attachment to each and every topic in the search path. However, the ordering may still be displayed to the searcher as an aid to show the searcher the ordering in the set of topics so far selected.

Thus, at any stage, the search request information includes the search topic path and any search phrase.

In one embodiment of Topixa, an initial search page provides for a user to input a search phrase and also to sign-in, in the case that a user is not signed in. Thus, initially, a searcher inputs a search phrase and is presented with a set of suggested topics, including refinement topics, and selected information items that result in searching for the input search phrase. The searcher may now select a topic from the suggested topics, or a search phrase.

In another embodiment of Topixa, an initial set of topicsis pre-defined, and this is the initial set of topics used to determine an initial set of suggested topics.

One aspect of the Topixa system described in the Parent Application is that it provides users, e.g., searchers who have registered by providing registration information, with the ability to create topics. In one version, in which an initial set of topics is pre-defined, users are thus provided with the ability to add to the initial set of topics. Another aspect of the invention is providing the capability for such users to create attachments between information items and topics. Another aspect of the invention is providing for such users the ability to rate attachments. In one embodiment, users are provided with the mechanism to rate an attachment between a topic and an information item using a binary rating system that has a first value ("positive," positively rating") and a second value ("negative," negatively rating") less favorable than the first value. Another aspect of the invention is a method of calculating an overall attachment quality for each attachment based on the rating of the attachment by users.

Another aspect of the Topixa system described in the Parent Application is that a registered user may select one or more topics to be "preferred" or "favorites" for that user. That user is presented with a view of the search results that differs from what is presented to another searcher. In one embodiment, the suggested topics for furthering a search are presented in an order in which topics that have been selected to be favorites appear before other topics.

Another aspect of the Topixa system described in the Parent Application is that suggested topics, e.g., refinement topics for furthering a search are presented in an order determined according to a refinement topic ranking method. In one embodiment, the ranking method depends on how registered users of the system have rated attachments to the search results for each potential refinement topic, in particular, according to the calculated overall attachment quality of the attachments between a potential refinement topic and the information items of the search results.

Yet another aspect of the Topixa system described in the Parent Application is a carrier medium, e.g., a storage mechanism, for storing a data structure that includes a user data structure to store the set of topics, a topic data structure configured to store the set of topics that are not necessarily hierarchically structured, an attachment data structure configured to store the attachments between topics and information items, e.g., Web pages. The data structures are part of a main data structure. In one embodiment the main data structure is in the form of a set of tables of a relational database, and the topic data structure, the user data structure, and the attachment data structure are each a table of the database.

BACKGROUND OF PRESENT INVENTION

In one embodiment of the Topixa system described in the Parent Application, all topic classifications are shared by every user. This feature of the system allows the operator of a service based on the system to create the critical mass of aggregated use knowledge. There is however a need for groups of users to view attachments that are created only by a specific user or only by a specific group of users. Such a need is illustrated by the following examples:

1. Suppose the operator of a Web site called Bay Area Hiker classifies his own site into topics in order to improve searching within his site. The user would like to share these classifications and URLs linked to these topics with some other users of the Improved Topixa system to provide for such other users the ability of searching within these topics, i.e., only in his site.
2. A group of people called the Wild California hiking group maintains a list of adventurous hikes in the area. Members of this group would like to view how other members have classified hikes into topics because members know that other members of this group are better at classifying hikes than some unknown person. That is, it is desired to provide for members of the group the ability of seeing search results only within the attachments belonging to other members of the group.
3. John is a user, and is classifying sushi restaurants in Senegal. John would like to share his classifications, i.e., his topics and attachment ratings with a selected set of friends, e.g., with his friend Brett who John knows is going to Senegal. John would also like to share his Sushi-savvy with Issy. There is a need to share John's attachments with a small group of friends.

One aspect of the present invention, called "Topixa groups" is to allow sharing a collection of attachments between URLs and topics among a pre-defined group of people. Example 2 above illustrates this need.

SUMMARY

Described herein are a method and a carrier medium carrying computer-readable arranged to cause one or more processors of a processing system to execute a method. The method includes defining a set of topics for attachment to one or more information items by at least one user, a user being a registered searcher. The defining of the topics includes accepting from at least one user at least one topic, and adding the topic to the set of topics. The topics do not necessarily have a hierarchical structure. Each topic is for attachment to one or more information items. The attached topics are for searching by a particular searcher for information item(s) according to search request information. Search request information includes at least one topic of the set of topics, and the searching includes identifying at least one information item that has attachment to the topic(s) of the search request information. The method further includes defining a collection of attachments that can be viewed and searched by a corresponding group of at least one user, the corresponding group defined for the collection. Each attachment in the collection is between a topic and one or more information items.

Other features and aspects will become apparent form the contents herein.

DETAILED DESCRIPTION

Described herein are a method and a search engine in the form of a computer program implementing a method to aid in searching. A set of topics is defined, the topics not necessarily hierarchical. At any stage of a search, a person using the system—called a searcher—provides either a search phrase or selects a topic from a provided first subset of the topics. As a result of the search, the searcher is provided with a second subset of the topics that would further the search, and in one embodiment, with results of the search so far.

One aspect of the invention includes providing for groups of users to view attachments that are created by only a specific user or only by and for a specific group of users.

Client-server Computer Network

Figure 1:
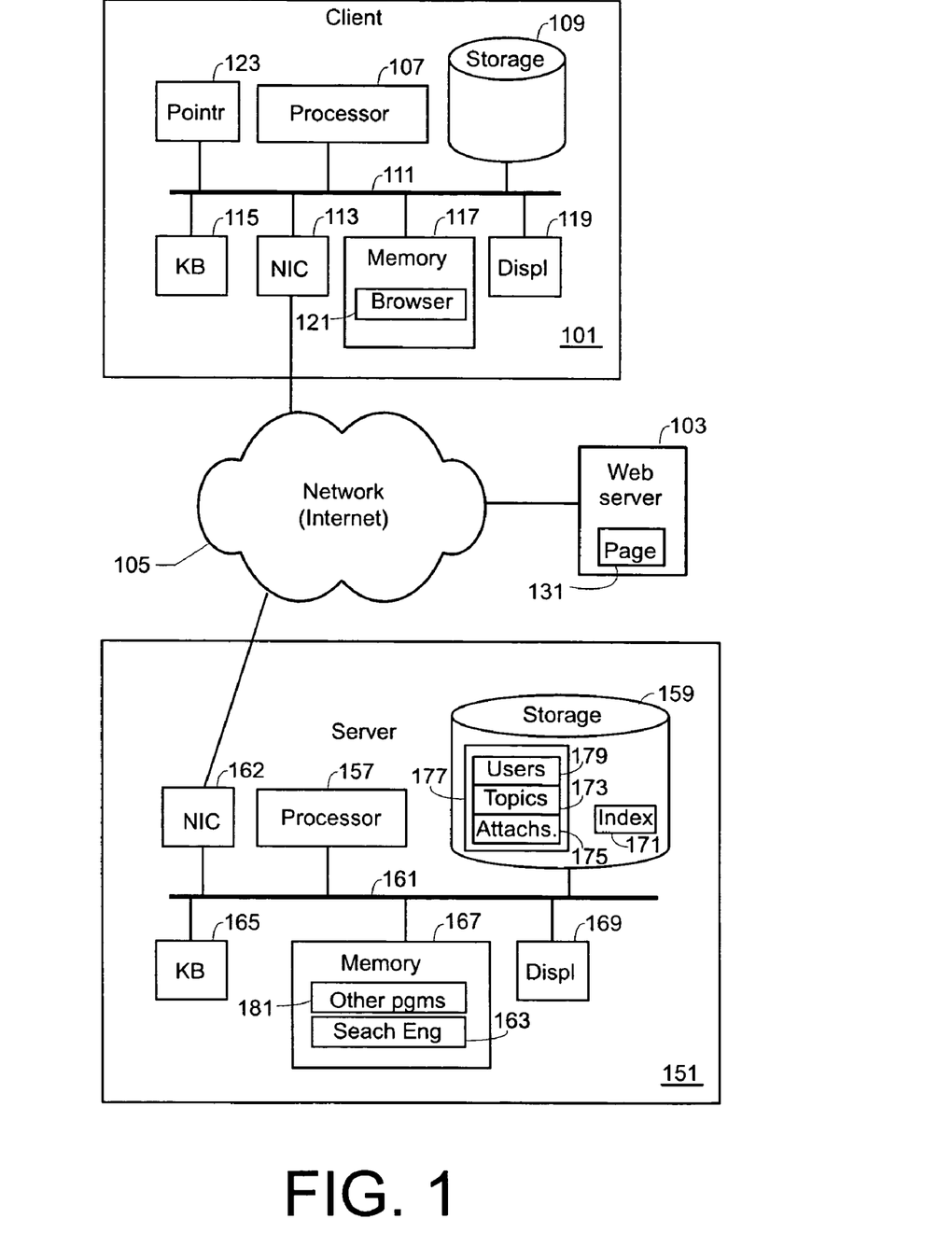
FIG. 1 illustrated an exemplary client-server environment that includes an embodiment of the present invention.

The present invention is preferably, but not necessarily, implemented in a client-server computer network, i.e. on a distributed computer system. An exemplary client-server environment that includes an embodiment of the present invention is illustrated in FIG. 1. An exemplary client 101 is connected to an exemplary Web server 103 via a network 105, and to a search server via the network 105. For illustrative purposes, the network 105 is the Internet. However, network 105 may be a private network (an intranet), an internetwork, an extranet or any other known mechanism for providing a network connection. While only one Web server 103 is shown, the Web server 103 is one of a plurality of servers which are accessible by clients, such as the one illustrated as client 101. The Web server is also accessible by a search server, shown as search server 151.

An exemplary client machine such as client 101 typically includes a processing system of at least one processor 107, a memory subsystem 117, a display subsystem 119, a keyboard 115, a pointing and selecting device 123 such as a mouse or another input device, all such input devices collectively shown as 123, local storage 109, and a network interface (NIC) 113 coupling the processor system to the network 105. The elements of the processing system of the client are coupled via a bus subsystem 111 that is shown for the sake of simplicity as a single bus. The client may include more or fewer components as is known.

An exemplary search server such as search server 151 includes a processing system of at least one processor 157, a memory subsystem 167, a display subsystem 169, a keyboard 165, local storage 159, and a NIC 162 coupling the processor system to the network 105. The elements of the processing system of the server 151 are coupled via a bus subsystem 161 that is shown for the sake of simplicity as a single bus. The search server may include more or fewer components as is known.

An exemplary Web server such as Web server 103 also includes a processing system not shown in detail in FIG. 1. The Web server stores Web pages that are each identified by a URL, as is well known. One such Web page is shown as page 131.

The client 101 includes a browser application 121 shown in FIG. 1 as being in memory 117, although those in the art will understand that not all instructions of the browser may be in memory at the same time, even when the browser is in operation. The user interface assumed in this description is implemented as pages that are displayed on the client's display 119 using a browser application 121.

The search server 151 includes a search engine application 163 shown in FIG. 1 as being in memory 167. The search engine includes aspects of the present invention, that is, a set of instructions implementing an embodiment of the invention, although those in the art will understand that not all instructions of the search engine 163 may be in memory at the same time. The search server 151 may also include one or more other programs shown as 181 in FIG. 1.

Furthermore, while FIG. 1 shows the search engine 163 operating in the search server 151, other embodiments of the invention need not operate, and in many cases will not operate on one server, but may operate on some other processor coupled to the shown search server, e.g., coupled to the server 151 via the Internet, or coupled to the server 151 via a local area network. It may also be that several method embodiments of the invention may operate at several locations all coupled via the Internet or a local network. Furthermore, a search engine in a processor on the internet may assign at least one task to various processors such that some aspects of the invention may operate remotely on at least one computer system, even in parallel on the computer system(s). How to modify the description herein to be implemented in a distributed manner would be clear to those in the art.

It may also be that several method embodiments of the invention may operate at several locations all coupled via the Internet or a local network. Furthermore, a search engine in a processor on the Internet may assign at least one task to various processors such that some aspects of the invention may operate remotely on at least one computer system, even in parallel on the computer systems. How to modify the description herein to be implemented in a distributed manner would be clear to those in the art.

Client-side and Server Side Operation

A method embodiment for operation by a searcher at the client side conducting a search is now presented. The search operates on the search server side.

Figure 2:
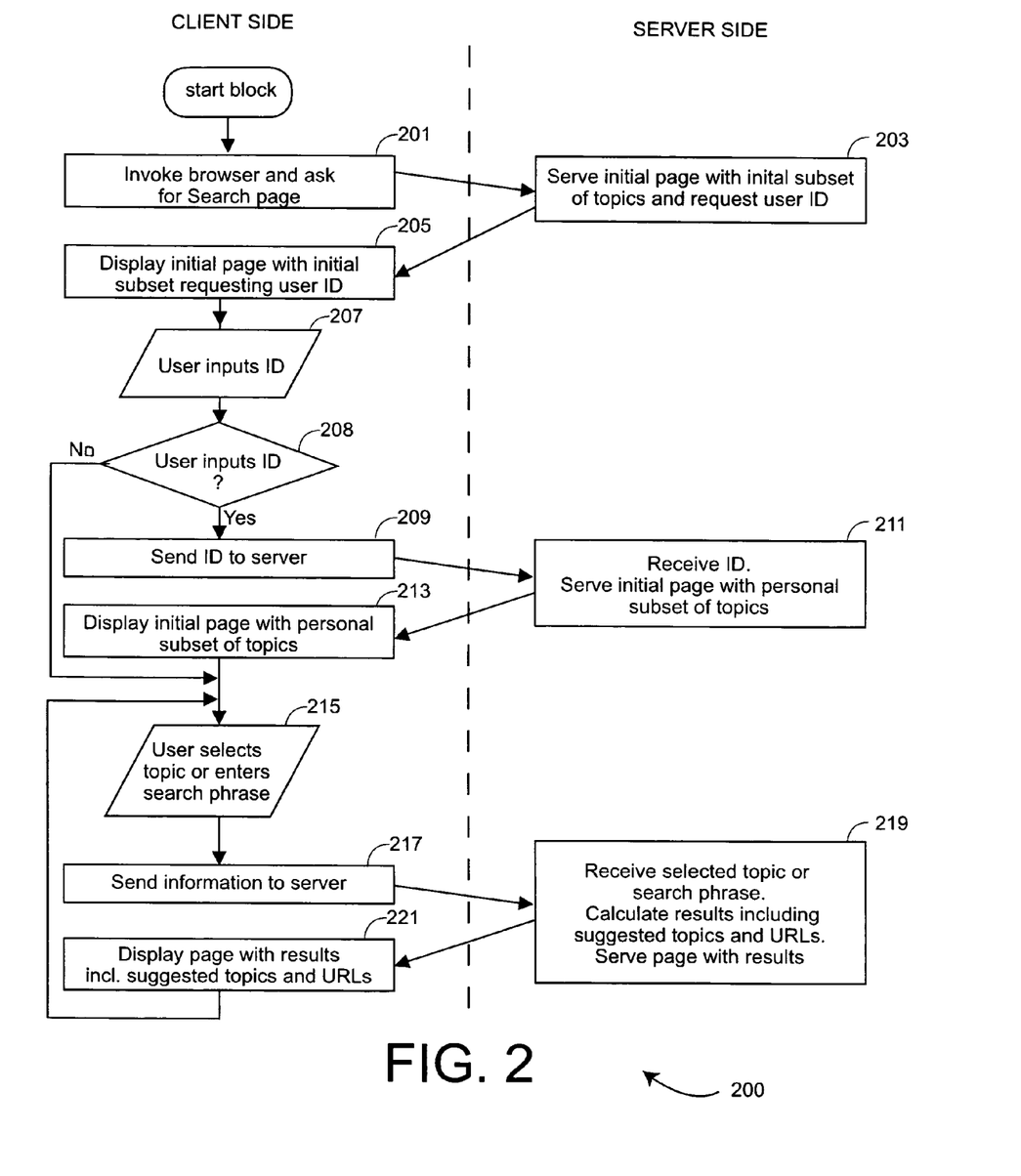
FIG. 2 shows a simplified flow chart of a method embodiment of the invention, shown as client side activities, and activities that occur at the search server in the network of FIG. 1.

FIG. 2, which is the same as FIG. 2 of the Parent Application, shows one method embodiment 200 of the invention, shown in what occurs at the client side and the server side. At the client side, a searcher in 201 invokes the browser and requests a search page from the search server 151 for display on the display 119 of the client 101. This is done, for example, by indicating to the client a Website that causes the Search server 151 to serve a start page for the searcher. On the search server side, in 203, the search engine 163 serves an initial search page that includes provision for the searcher to enter a search phrase.

In one embodiment, provision is also provided on the initial page displayed in 205 for a searcher who is a user, i.e., who has provided registration information, to log into the system by providing, in 207, a username and password. In such an embodiment, provision is also presented for a non-user searcher to register with the system to become a user, by providing registration information to the system, or to choose to continue as a non-user.

In a variation, the initial search page also includes an initial subset of the set of topics presented to the searcher, with provision for the searcher to select any of the presented topics. In one embodiment, the initial subset is pre-defined as an initial subset of topics to present to any searcher. In another embodiment, the initial subset is user specific. For example, in one version, the user-specific initial set is pre-defined according to properties, e.g., properties entered during registration of a user. In one version, alternatively or in addition, a particular user can modify the pre-defined initial subset to form a personalized user-specific subset for initial display. A user of the set of users may add to a general initial subset of topics or a user-specific initial subset by defining new topics and/or new attachments between topics and information items. Alternatively, in addition, the user-specific initial set is calculated according to previous activity by the user. In one embodiment, the user table 179 thus includes information on the personalized subset of topics for each user. In another embodiment, the topics table 173 includes for each topic the names of each user that claims "ownership."

On the client side, the client 101 receives the initial page, and the Web browser displays the initial page on the display 119. The user may input proper user name and password (collectively "user ID") in 207.

If the user has successfully inputed a proper user name and password (see branch 208), the client in 209 sends the user ID to the server 151. The search engine 163 in 211 receives the information, looks up the user ID (denoted UserID herein) in the set of users in table 179 to authorize the user, and assuming successful authorization, in 211 serves a new initial page. In one embodiment, the initial page includes an initial subset of the topics personalized, e.g., selected by or for the user.

At the client side, in 213, the new initial page with the personalized subset of topics is presented to the user on the display 119 with provision for the user to select one of the topics, e.g., by clicking on the display of a topic, or by the user entering a search phrase and causing a search, e.g., by pressing a button labeled search on the initial page.

In the remainder of the discussion, the searcher may be a user or, as a result of branch 208, a non-registered searcher.

Thus, in the case that topics are provided for the user, the client 101 at 215 waits for the searcher to select a topic or input a search phrase. The selected topic and any search phrase input is referred to herein as the "search request information." Once the search request information is provided, then, in 217, the client sends the search request information to the search server 151.

At the search server 151, in 219, the search request information is received, and the search engine in 219 generates results based on the search request information. As will be described in more detail below, one aspect of the invention is that the search results generated in 219 include one or more URLs that meet the search request information according to one or more search criteria (see below), and further includes one or more sets of suggested topics that the searcher may select such that the searcher's electing any of the suggested topics will further direct the search. The generating of the suggested topics is described in more detail below.

Continuing at the search server, 219 further includes generating and serving a new page containing the search results, including the suggested topics, and further including any topics selected so far.

At the client 101, in 221, the served page is received and displayed to the searcher. The searcher may now continue the search. The client side process thus returns to 215 wherein the client 101 waits for the searcher to select a topic, e.g., one of the suggested topics as an additional topic, or a previously selected topic, or for the searcher to enter a new search phrase, or for the searcher to select one of the displayed URLs for further display.

Note that the flow chart of FIG. 2 does not include such details as the searcher ending the process, a user logging off, a non-registered searcher registering, and so forth. That such features may be included would be clear to those in the art, and further, how to expand the flow chart to include such features would be clear to those in the art. Furthermore, the flowchart of FIG. 2 does not include details on how to receive Web pages, how to generate Web pages, and other aspects that would also be known to those in the art.

A hierarchical search may thus be continued by continuing with 215, 217, 219, and 221 that include requesting and providing search request information on the client side, then generating results for the search request information and a Web page containing the results in the search server side, then displaying the results in back in the client side. Each such loop furthers the search in a hierarchical manner.

Note that when URLs are displayed, e.g., as results of a search for search request information, each of the URLs may be displayed in various forms, including a digest of the contents, as is common today in search engines such as those operated by Google, Inc., of Mountain View, Calif. Clicking on the URL provides a display of the web page to the searcher or user.

In one embodiment, the results page served in 219 and displayed to the searcher in 221 includes:

Each topic so far selected and each search phrase so far entered, in order.

A set of suggested topics.

The search phrase or the present phrase and previous included phrases.

The URLs of the search phrase under the topics so far selected.

One embodiment provides for a user, i.e., a registered searcher, to define a set of favorite topics. In such an embodiment, the results page served in 219 and displayed to the searcher in 221 further includes the set of the user's favorite topics.

Described herein are further improvements that provide for link collections.

Search Topic Paths and Search Criteria

As described in the Parent Application, a search may be hierarchical in that the search may traverse a set of topics by the searcher selecting one topic, then next time a page is requested, another topic, and so forth. For example by selecting a search topic A, the searcher will be shown a set of results under, i.e., attached to topic A. By now selecting a second topic, say topic B, the searcher will see results that are attached to topic B from within the previously shown results, thus also attached to topic A. Thus, a hierarchy of topics is generated on the fly for the searcher. By a "search topic path" is meant the set of topics selected during a particular search by a particular searcher. The last topic in a search topic path is the most recently selected topic in such a traversal. In one embodiment, the order of the search topic path is not important, in that any URL in a search topic path has an attachment to each and every topic in the search path. However, the ordering may still be displayed to the searcher as an aid to show the searcher the ordering in the set of topics so far selected.

Thus, at any stage, the search request information includes the search topic path and any search phrase.

Note further that at any point in a search, the searcher may shorten the search topic path by selecting an earlier traversed topic as the last topic.

For example, denote by A, B, C, and D four topics of the set of topics. Denote by A>B>C>D the search topic path of a presently displayed page requesting search request information. The searcher may now select topic C in the search topic path. The search request information now includes the search topic path A>B>C, and the new resulting search page will have as the search topic path A>B>C, and the URLs displayed will each have an attachment to each of topics A, B, and C.

Search request information thus includes the active search topic path and any active search phrase. Note that a search phrase acts as if it is a topic—thus called a pseudo-topic herein—in that any URL that satisfies the criterion or criteria for a search phrase may be considered similar to being attached to the search phrase, called a pseudo-attachment herein. Thus, when there is a search phrase, denoted by S, and a search topic path A>B>C>D, the search request information consisting of A>B>C>D and search phrase. S may be considered as the search topic path A>B>C>D>S, with the search phrase S considered a pseudo-topic and URLs that result from searching for S regarded as having pseudo-attachments to the phrase S. A searcher can enter several search phrases in a search, for example S1 and S2, thus creating a path like A>B>S1>C>S2 In one embodiment, this is the same as the search path A>B>C>(S1.and.S2).

Link Collections

Figure 3A:
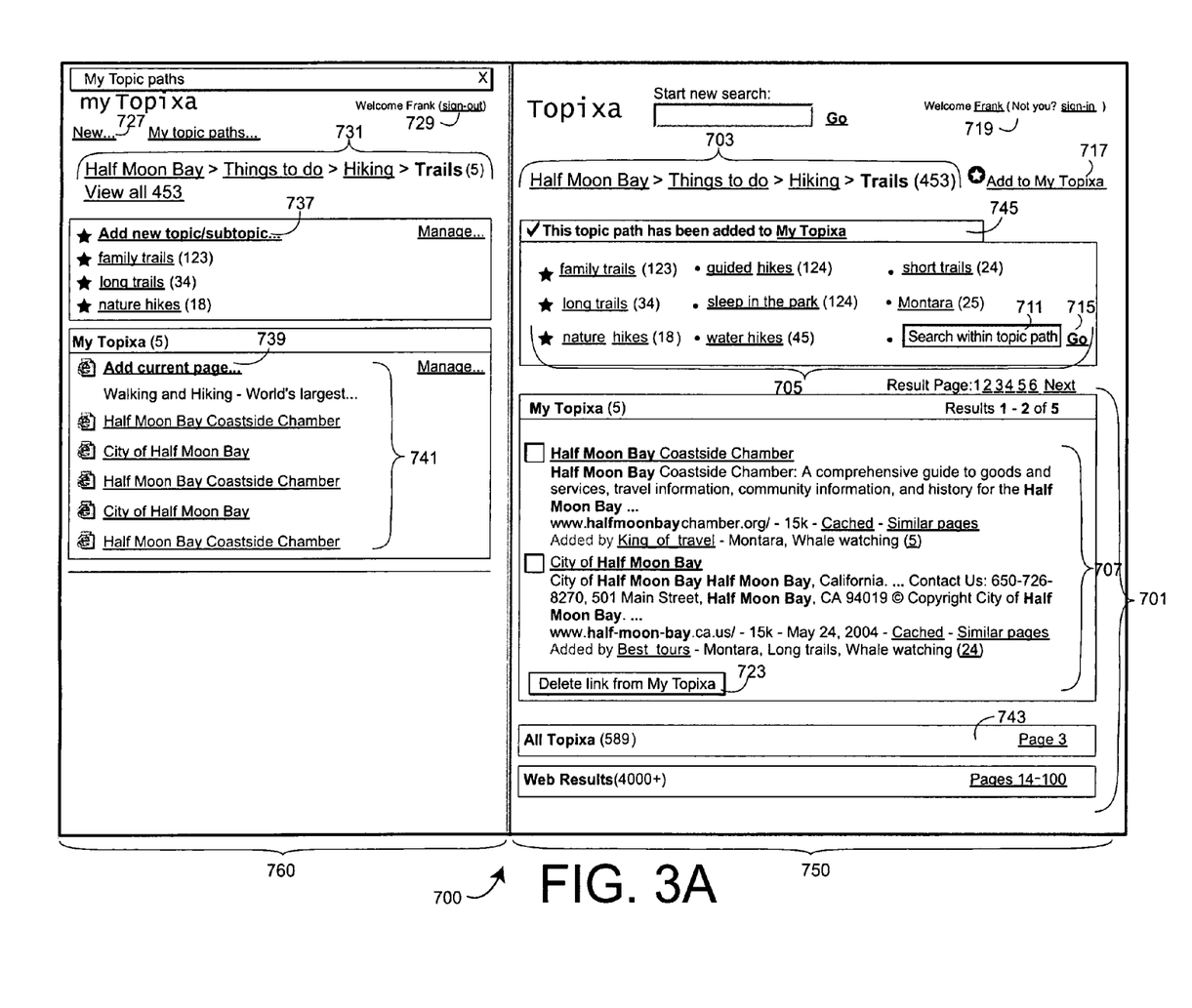
FIG. 3A is from incorporated herein by reference Provisional Patent Application Ser. No. 60/609,215, and describes a user interface that shows how the results of a search may be shown in two forms

FIG. 3A is the same as FIG. 7 of the Parent Application (incorporated herein by reference Provisional Patent Application Ser. No. 60/609,215) and describes a user interface display 700 that shows, for a search example, how the results of a search at some stage of a search may be shown in two forms: a main display area 750 and a user-specific explorer bar (or other additional window) 760. The presented user interface display 700 includes an indication 719 of the current user, in this example as a Welcome message with a username selected by the user during registration. Provision is also provided for the user to indicate, e.g., by signing in, if the username shown is of a different user. Sign-out provision 729 also is provided, in this example in the explorer bar 760, for the user to sign out.

The main window 750 of the presented user interface display includes a user specific manner of presenting results. For example, the main window 750 includes an indication of the search topic path 703, in this case again "Half Moon Bay>Things to do>Hiking>Trails." In one embodiment, a provision to add the current search topic path to a stored set of the user's favorite search topic paths is included, in this embodiment as a clickable object 717 labeled "Add to My Topixa" or similar designation, where in this example, "My Topixa" is a user's user specific information, such as the user's favorite topics, positively rated attachments, and other user specific information. In one embodiment, the main window 750 also includes a message area 745, which in the example shown contains the message "This topic path has been added to My Topixa." Such a message would result, for example, after the user clicks on the clickable object 717 to make the current search topic path 703 a favorite.

In one embodiment, the main display window 750 of the presented third user interface display 700 further includes the URL results 701, in this embodiment, in three different presentations. The first includes the positively rated, e.g., "favorite" results, that is, those URLs that have attachments to the topic(s) of the search topic path that the user has "selected" to be included as the user's "Favorite" attachments. The second list 743 is of the overall results.

In one embodiment, the main window 750 of the presented user interface display 700 includes in the favorites results 707 a provision to "junk" one or more of the results, e.g., in the form of a check window 721 and a "junk" button 723 appropriately marked with "Delete link from My Topixa," where "My Topixa" is the list of favorite attachments under the search topic path. Checking any result(s) and clicking on a provided button 723 negatively rates the attachments of the marked URLs to the search topic path.

The main window 750 of the presented user interface display 700 also includes a set of suggested topics in the form of a set of refinement topics 705. In one embodiment, the number of URLs under each of the suggested topics also is displayed. One embodiment of the presented user interface display window 750 further includes a mechanism for the searcher to provide an additional search phrase to search for within the search topic path. In FIG. 3A, this mechanism is in the form of a text window 711 within which the user can enter the search phrase, and a button 715 to initiate the next step in the search.

In one embodiment, the set of refinement topics is presented with an indication of which of the suggested topics are the user's favorite topics. In FIG. 3A, a star is shown in the list 705 to indicate the favorite suggested topics. Furthermore, the ordering is such that the favorite suggested topics are presented before the other suggested topics. In the example shown in FIG. 3A, three of the suggested refinement topics: "family trails," "long trails," and "nature hikes" are favorites, e.g., have previously been selected as favorites by this user.

In one embodiment, and of relevance to aspects of the present invention, the user interface display 700 includes a user-specific explorer bar 760 (or similar panel) that provides user specific information. In one embodiment, the present search topic path is displayed 731 if such a search topic path was made favorite. In an alternate embodiment, the present search topic path is displayed 731 even if such a search topic path was not made favorite. A clickable object is provided for displaying and managing all favorite search topic paths, and a clickable object, here labeled "New . . . " 727 is provided for adding a new search topic path as a favorite search topic path.

In one embodiment, the explorer bar (or similar panel) 760 includes a list 741 of the user's favorite attachments for the present search topic path. The explorer bar (or similar panel) 760 further includes a clickable object 739, labeled in FIG. 3A as "Add current page" for adding an attachment between the currently displayed search topic path, and the Web page displayed in the main window 750. Thus, a user selects a Web page by clicking on one of the results 701. This causes that URL to be served and displayed in the main window 750. A user now clicking on the clickable object 739 causes information to be sent to the server that adds attachments between the URL displayed in the main window and each topic in the currently displayed search topic path 731.

Thus, a mechanism is provided for the user to rate the quality of any attachment between a displayed search result and the search topic path.

In one embodiment, the explorer bar (or similar panel) 760 of the user interface display 700 includes provision for the user to add a topic or subtopic. In the version shown, the provision is in the form of a clickable object 737 that when invoked, causes the server to serve a popup page for adding a new topic, or a subtopic to the presently displayed search topic path, e.g., to the last topic in the search topic path. Each new topic or subtopic becomes a favorite for the particular user.

A particular user's user-specific information (called "My Topixa" in this drawing) includes the user's favorite topics, the user's positively rated attachments, and other user specific information. The results shown in the "My Topixa" window 760 are only the positively rated, e.g., "favorite" results, that is, those URLs that have attachments to the topic(s) of the search topic path that the user has "selected" to be included as the user's "Favorite" attachments.

One might say that user specific results (window 760) are those results from searching within a first "collection" called My Topixa for that user. The searching within the first collection accessible to a first group, e.g., the group consisting of only that user. The other window, window 750 in user interface 700, can be thought of as the results of searching within a second "collection" which includes the whole system. Searching within the second collection is accessible to a second group that in this case includes all the users of Topixa, and in one embodiment, non-user searchers too, i.e., searcher's who have not registered with the system.

An aspect of the present invention is generalizing the concepts to provide for defining collections, with each collection accessible to a corresponding group of users defined for the collection. By a "link collection" is meant a set—a virtual "area"—of links, i.e., attachments that can be viewed and searched separately by a group of one or more users, as described herein by way of examples. As a first example, suppose that a user Mary wishes to form a collection of attachments such that she and any other member of a group of mothers she knows in Menlo Park, Calif. can use them. Mary can form a link collection for the group of users. The collection has a name, e.g., the "Menlo Park Moms group" link collection. Mary lets each member of the group know of the existence of this collection, e.g., by letting them know of the name of the collections, and e.g., forming a password and letting the members know of the password. Some members of the group can be provided the privilege of defining links to be within that collection. Other members who do not have this privilege then only have viewing and searching privileges. This provides a member of the group the capability of carrying out a search as described in the Parent Application, and further, to view the results of such a search that are within the collection, e.g., only classified into topics that are part of the collection, with suggested topics that are only part of the collection, and of URLs that have links to the collection.

As described above, the Parent Application already describes two types of link collections.

Personal (private) link collections. For a particular user, these are the links, topics, etc., that have been added, i.e., positively rated by the particular user. See, e.g., "My Topixa" in FIG. 3A (the same as FIG. 7 of the Parent Application) and the description thereof. These are the My Topixa topics, links, etc. The group of users for a personal collection consists of the particular user. When conducting a search, the particular user can view the search results separately, e.g., in a separate window, that is part of that user's personal collection.

The overall collection for the system. This is the "All Topixa" window of results shown in FIG. 3A (FIG. 7 of the Parent Application). Any user sees these results. Thus, the group of users who can view the results of the overall-link collection is the overall set of users. In one embodiment, non-users, e.g., searchers who have not registered with the system also can view such results. This overall link collection is called the system's link collection herein.

It is desired to generalize this to have one or more collections that corresponding groups of particular users can see and search within. Each link collection is associated with a user—called the link collection's creator—who defined the collection. Each link collection further has a name—the link collection name—by which the collection may be identified, and a group of people—the link collection group—to whom the collection is accessible, called the members of the link collection group. Alternatively, rather than a group of pre-defined users, each link collection has an associated set of at least one password. A person who knows the password may access and use the link collection. In one version there are two passwords, one to provide editing privilege (see below), and another to provide viewing privilege so that the user may search within the collection. Thus, any member can view results of a search with the collection. Furthermore, in one embodiment, the member's of a collection's group, i.e., the group of people associated with a collection includes a subset of one or more members, including at least the creator, who have editing privilege in that such a member may define topics to be part of the link collection, and with such defining of a topic, automatically define all the links that he attached to this topic. Thus, any member has viewing privileges to view search results within the group, and some member(s) have editing privileges. In one embodiment, when a member views the name of a link collection, the collection's creator's username is concatenated, in the possessive form, with the collection's name. For example, if Mary created the collection called "Menlo Park Moms group," then members of the group can search and view search results within this collection, and the collection's name appears as "Mary's Menlo Park Moms group" in the system and for such users. Of course in other embodiments, the creator may be identified differently.

Figure 3B:
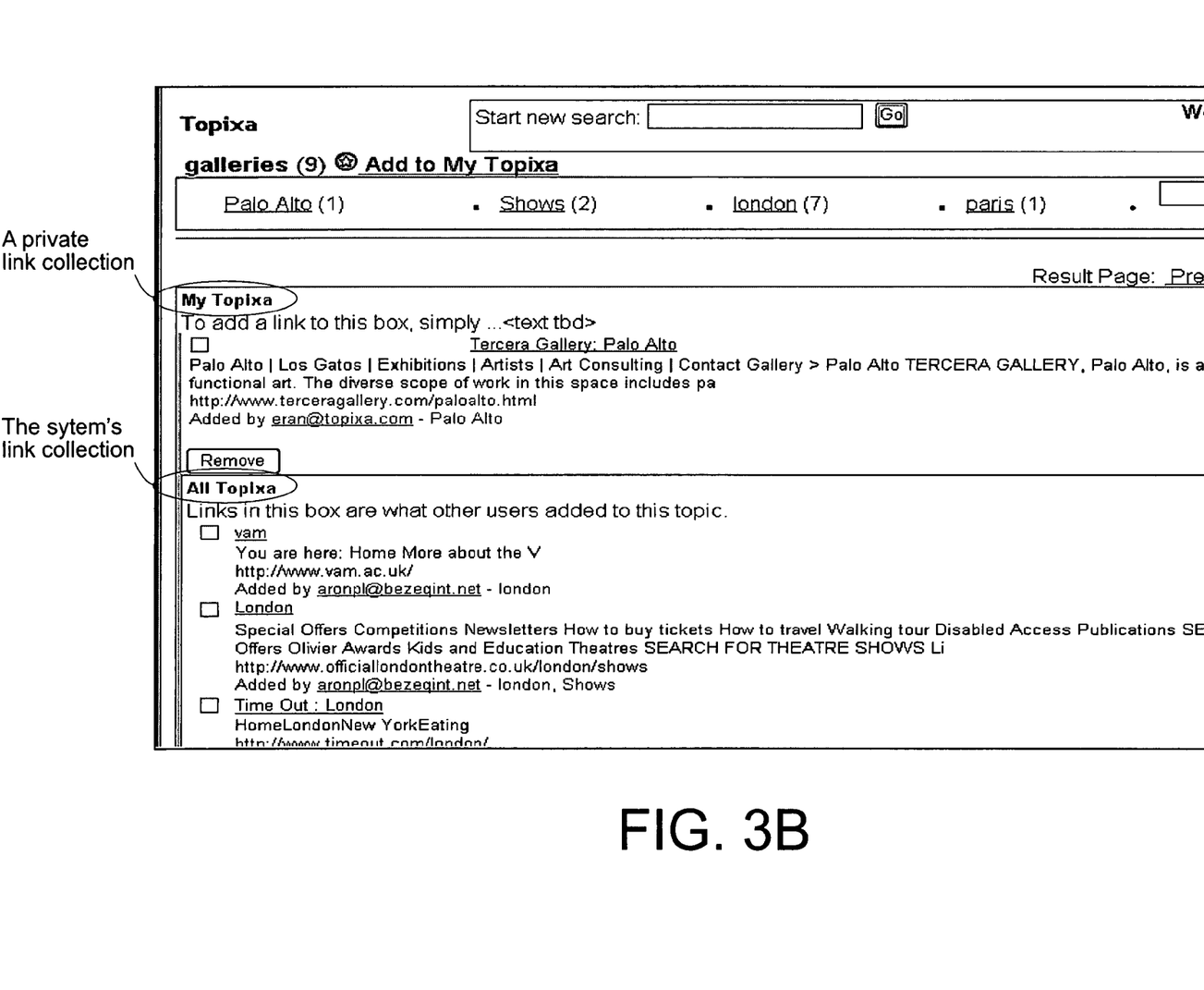
FIG. 3B shows an alternate version of the main widow of FIG. 3A, according to an embodiment of the invention.

FIG. 3B shows an alternate version of the main widow labeled 750 in FIG. 3A (FIG. 7 of the Parent Application). The term "topic" in FIG. 3B refers to what was called a "search topic path" in the Parent Application and in the text part of this description. "My Topixa" is an example of a private collection, and the results there under are the results within that private collection. Assume the user has a username Eran. When one or more aspects of the present invention are incorporated, this private collection is called "Eran's links" The main window shown in FIG. 3B further shows the system's link collection called "All Topixa" The viewer can see results that are part of the system's link collection.

Figure 4:
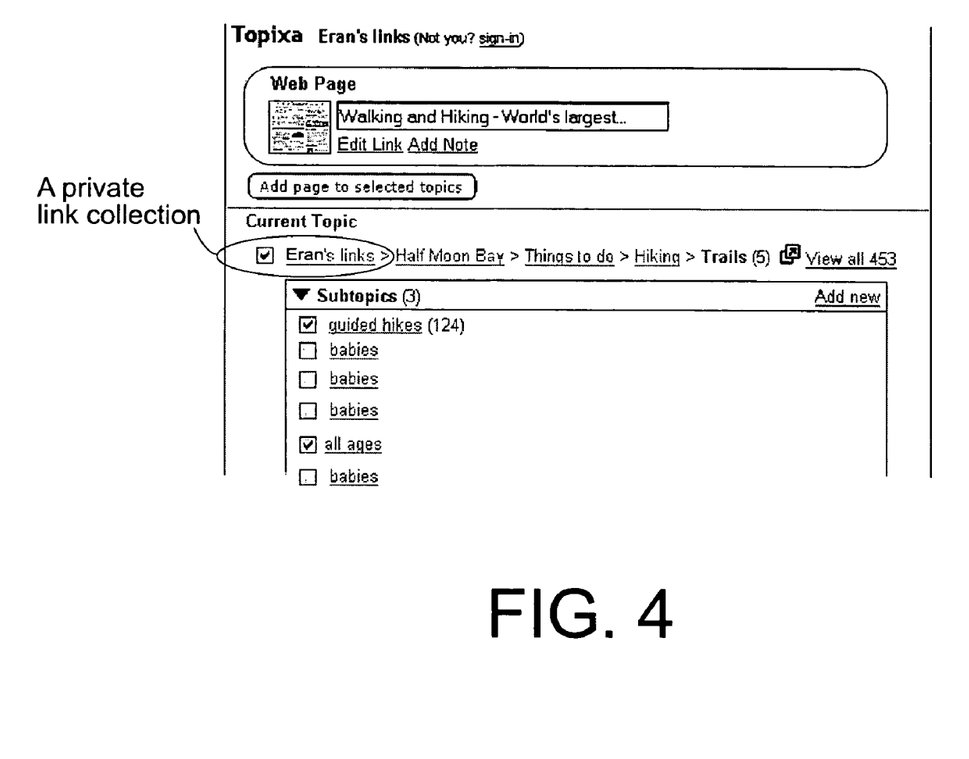
FIG. 4 shows a version of the explorer bar that, after a user logs into the system, shows user specific information, according to an embodiment of the invention.

FIG. 4 shows a version of the explorer bar, also called the left pane herein, that, after a user logs into the system, shows user specific information. In FIG. 3A (FIG. 7 of the Parent Application), this is called the explorer bar 760. FIG. 4 includes the user's private link collection called "Eran's links" and subtopics therein.

Creating and Maintaining Link Collections

One aspect of the invention is providing a user with the capabilities of: creating one or more new link collections, attaching one or more search topic paths to an already created link collection, viewing all search topic paths of a created link collection, and sharing any created link topic collection with others. Which of these capabilities a particular user has depends on the privilege provided to such a user within the group of any particular link collection.

As defined above, a user who creates a link collection is the collection's creator. The full name of a link collection is the concatenation of the username of the creator and the collection name created by the creator. In one embodiment, the concatenation uses the possessive form. For example if a user with a username Eran creates a link collection and names it "Oregon Trip," then the full name of the link collection in Improved Topixa is "Eran's Oregon Trip". So, the Pseudo search topic path "Eran's links" is just a default link collection called "links" for everything a user having a username Eran creates. Note that the underlying assumption is that usernames are unique in the system Sharing a Collection A user can share a link collection with a group of at least one other person. Such other person need not be a user, but any searcher. However, for such other person to search within the link collection, e.g. to view search results within that search collection, in open embodiment, the searcher would need to know about the collection name and possibly password. Furthermore, in one embodiment, the searcher need not be a user, i.e., register with the Improved Topixa system to access the collection. In the description herein, users are assumed.

In one embodiment, each share with a particular user can provide such user with editing privileges, or with view only privileges. In one embodiment, every link collection has two associated passwords, a first with edit privileges and one for view only. Thus, in such an embodiment, editing privileges may be provided by a user using the password used for editing privilege. The providing of the editing or viewing privilege is by letting the other user know the appropriate password. Thus, sharing a collection is as easy as sending someone the collection name and the password for the appropriate privilege.

Any viewer can also view the results in the collection in the search pane—the main search window (e.g., FIG. 3B). By having the password with edit privilege to a collection, a viewer also can "import" a collection to a left-pane (FIG. 4)—what we also call an explorer bar—for edit.

Using Link Collections in a Search

One aspect of the invention is that the system provides for searching within a plurality of link collections. In one embodiment, the default search collections for a user of the system are the system's link collection ("All-Topixa") and any collections that the user created. If the user has not yet created any collections other than the user's default collection, then the user's private link collection is the only collection used, e.g., for a user Eran, the private collection called "Eran's links" in FIG. 4, and called "My Topixa" in FIG. 3A (FIG. 7 of the Parent Application), is the only link collection.

When searching, one aspect of the user interface is that a user can select which collections the user wants to view in a search. For example, in one embodiment a user can "minimize" any link collection such that only the title of the link collection is shown, to save space on the display screen, or a user can "maximize" (or leave maximized) any link collection such that information about the link collection, such as topics, search topic paths, and so forth are visible. In one embodiment, searching, e.g., under a topic of a search topic path, or using a search phrase, provides search results only for those link collections that are maximized.

A user can add a link collection to any search the user carries out if the user knows the link collection's name and a password. In one embodiment, a password with view-only privilege is all that is required for adding a link collection to a search pane.

One embodiment provides the capability of adding a parameter to the URL of the system that defines which link collection(s) to show. For example, using such parameters when invoking the system on a browser, a user can have displayed on the user's client browser window only the requested link collection. For example, suppose there is a link collection created by a user of username Bay Area Hiker and such a user shared this with members of a group by sending the name and the password. Such a group member can call up a window that displays only the collection called Bay Area Hiker's links.

Functions Added to the Left Pane

By way of example, not meant to be limiting, here is a set of commands that can be used on the left pane—the explorer 760 of FIG. 3A (FIG. 7 of the Parent Application) and the pane shown in FIG. 4. This example is provided to illustrate the functionality that can be provided in different embodiments of the invention:

Display the link collection at the beginning of the path, but in a way that it is clear that this is not a search topic path, but something else.

Near the link collection, one embodiment includes the commands: Add collection;Change Collection;See All; Edit.

The command See All is included, and is an abbreviation for getting back to the user's private collection, e.g., "Eran's links" for use of the username Eran.

The command Change Collection is included to provide a user with the ability to choose form other collections of that user, to put this collection at the beginning of the search topic path, and to show only this collections search topic paths The command Add Collection will prompt a screen that enables the user to add a collection. The user can define a new collection, or "import" a collection by, for example, writing the creator/name/edit-password of the collection.

The command Edit collection enables changing the passwords of a collection.

Near the search topic path, one embodiment displays a command Add to collection which prompts the user to select from the list of the user's collections The command E-mail collection provides for sending an e-mail to another user that will give a link for the user to either add this collection to such other user's left pane for editing or to view his collection in a search pane.

Other embodiments add other commands and capabilities for manipulating link collections.

Usage Scenarios'

The following are some examples of how users of the system can use different aspects of the invention.

Better Search to a Site

John is the operator of a Web site called Bay Area Hiker and classifies his own site into topics in order to improve searching within his site. To share these classifications and URLs linked to these topics with some other users of the Improved Topixa system, John creates a user in the system with username "Bay Area Hiker." As user Bay Area Hiker, he classifies information in his site under several topics in order to improve searching within his site. These topics are put under the shared collection "Site."

The Bay Area Hiker operator now makes a link from his site to the Improved Topixa system, giving as a parameter in the URL an instruction to display only his shared link collection and also a view only password so that another user cannot add to this shared collection.

A user following this link will see the search window of the Improved Topixa system with only the link collection called "Bay Area Hiker's Site". This provides for searching within that site Yahoo Group Favorite Links on Steroids Mary, a user from a group in Menlo Park, Calif., known locally as the Menlo Park Moms group creates a new user in the Improved Topixa system for the moms group with username Menlo Park Moms group, and creates with the user Menlo Park Mom's group a collection called important links. She classifies some links under this collection under the user Menlo Park Moms group. The name of the collection will then be Menlo Park Mom's group's important links.

Using the left pane, Mary sends an e-mail to all members of the group for sharing this collection, including the editing privilege password. When a group member opens this e-mail, it will lead him or her, e.g., manually or automatically depending on how the email was formed, to add this link collection to his or her information user in the Improved Topixa system. Thus, such a user will see the Menlo Park Moms group's important links collection it in the left pane for editing, and also in the right pane for searching.

Mary further creates a link with a URL containing parameter(s) to show only the Menlo Park Moms group collection, and embeds the link into a Web site formed for the Menlo Park Moms group collection moms group. Suppose there is also a shared Web group, e.g., a Yahoo group for the Menlo Park Moms group. Mary adds the link to the links section in the published Web group, e.g., Yahoo group for the Menlo Park Moms group.

Peer to Peer Sharing

Frank is a user, and has added many topics to URLs on sushi restaurants in Senegal, and classified the links. Frank would like to share his classifications, i.e., his topics and attachment ratings with a selected set of friends, e.g., with his friend Brett who Frank knows is going to Senegal. Frank defined a collection called "Senegal sushi bars," and attaches the topics related to his Senegal sushi bar classifications to the link collection.

Using the left pane, Frank sends an e-mail to his friend Brett, giving Brett a link to see all his links under this collection in Improved Topixa. Brett can now view Frank's topics and sees them as "Frank's Senegal sushi bars."

Brett takes a trip to Senegal. After the trip, Brett asks Frank to add more sushi bars he found. Using the left pane Frank sends Brett a link that provides Brett with editing privilege to this collection. Brett can now add his own topics and his links to URLs to the "Frank's Senegal sushi bars" collection. At some other point, Brett can share this collection with view-only privilege to his friend Issy who is going to Senegal.

Thus, a method has been described for improving upon what was described in the Parent Application.

In the above, the terms "link" and "attachment" are used interchangeably. They are synonymous.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a machine which includes a one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries computer-readable code (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium carrying computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a search server. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
   defining a set of topics for attachment to one or more information items of a plurality of information items, the defining being by at least one user, a user being a searcher who has provided registration information, the defining the topics including:
      accepting from at least one user at least one topic; and
      adding the topic to the set of topics,
   wherein the topics do not necessarily have a hierarchical structure;
   wherein each topic is for attachment to one or more information items of a plurality of information items, and
   wherein the topics that are attached to at least one information item are for searching by a particular searcher for one or more information items of the plurality of information items according to search request information provided by the particular searcher, search request information including at least one topic of the set of topics, the searching including identifying at least one information item that has attachments to the at least one topic of the search request information,
   the method further comprising:
      defining a collection of attachments that can be viewed and searched by a corresponding group of one or more users, the corresponding group defined for the collection, each attachment in the collection being between a topic and one or more information items.

2. A computer readable medium for storing computer readable code arranged to cause one or more processors of a processing system to execute a method, the method comprising:
   defining a set of topics for attachment to one or more information items of a plurality of information items, the defining being by at least one user, a user being a searcher who has provided registration information, the defining the topics including:
      accepting from at least one user at least one topic; and
      adding the topic to the set of topics,
   wherein the topics do not necessarily have a hierarchical structure;
   wherein each topic is for attachment to one or more information items of a plurality of information items, and wherein the topics that are attached to at least one information item are for searching by a particular searcher for one or more information items of the plurality of information items according to search request information provided by the particular searcher, search request information including at least one topic of the set of topics, the searching including identifying at least one information item that has attachments to the at least one topic of the search request information, the method further comprising:

defining a collection of attachments that can be viewed and searched by a corresponding group of one or more users, the corresponding group defined for the collection, each attachment in the collection being between a topic and one or more information items.

\* \* \* \* \*